United States Patent [19]

Wrobel

[11] Patent Number: 4,955,791
[45] Date of Patent: * Sep. 11, 1990

[54] SMALL SIZE FAN

[75] Inventor: Günter Wrobel, Villingen-Schwenningen, Fed. Rep. of Germany

[73] Assignee: Papst-Motoren & Co. GmbH, Fed. Rep. of Germany

[*] Notice: The portion of the term of this patent subsequent to Apr. 12, 2005 has been disclaimed.

[21] Appl. No.: 247,336

[22] Filed: Sep. 21, 1988

Related U.S. Application Data

[63] Continuation-in-part of Ser. No. 137,945, Dec. 28, 1987, Pat. No. 4,801,252, which is a continuation of Ser. No. 731,880, May 8, 1985, Pat. No. 4,743,173, and a continuation-in-part of Ser. No. 930,421, Nov. 14, 1986, Pat. No. 4,737,673.

[30] Foreign Application Priority Data

Sep. 21, 1987 [DE] Fed. Rep. of Germany ....... 3731710
Mar. 19, 1988 [DE] Fed. Rep. of Germany ....... 3809277

[51] Int. Cl.[5] .................. F04D 29/00; F16C 27/00
[52] U.S. Cl. ................... 417/354; 417/423.12; 310/67 R; 310/90

[58] Field of Search ............ 417/354, 359, 361, 423.1, 417/423.12; 384/215, 218, 219, 220, 295, 297, 425, 438; 310/42, 67 R, 90, 261, 87

[56] References Cited

U.S. PATENT DOCUMENTS

| 3,644,066 | 2/1972 | Heob et al. | 417/354 |
| 4,373,861 | 2/1983 | Papst et al. | 417/354 |
| 4,564,335 | 1/1986 | Harmsen et al. | 417/354 |
| 4,612,468 | 9/1986 | Stürm et al. | 310/67 R |
| 4,737,673 | 4/1988 | Wrobel | 310/67 R |
| 4,783,608 | 11/1988 | Gruber et al. | 310/67 R |

FOREIGN PATENT DOCUMENTS 3417127 11/1985 Fed. Rep. of Germany ...... 417/354

Primary Examiner—Donald E. Stout
Attorney, Agent, or Firm—Barnes & Thornburg

[57] ABSTRACT

A bearing assembly for a small compact sized fan is provided which can utilize either a sintered bearing or a roller bearing, and which provides several embodiments for positioning the bearings in a radial and axial direction. The invention utilizes a bearing support tube for constraining the bearing in radial direction and an end cover cap attached to a flange of the fan duct to retain the bearings in an axial direction.

35 Claims, 5 Drawing Sheets

SMALL SIZE FAN

BACKGROUND AND SUMMARY OF THE INVENTION

This application is a continuation-in-part application of my prior applications Ser. No. 07/137,945 filed Dec. 28, 1987, entitled Slide Bearing Unit for Small Size Fan, and now U.S. Pat. No. 4,801,252, which is a continuation of application Ser. No. 06/731,880 filed May 8, 1985 which issued May 10, 1988 as U.S. Pat. No. 4,743,173 entitled Slide Bearing For Small Size Fan and a continuation-in-part of application Ser. No. 06/930,421 filed Nov. 14, 1986, entitled Boring Assembly For An Axially Compact Minature Motor or Ventilator now U.S. Pat. No. 4,737,673.

The invention relates to a bearing arrangement, particularly for a compact small-size fan, having a central driving motor held by a flange and a bearing support tube. The fan has an impeller which is fastened at the rotor of the driving motor, a bearing unit for the shaft of the driving motor and a housing surrounding the impeller forming a flow duct.

In small-size fans, ball bearings or slide bearings are used for supporting the shaft of the driving motor. For example, EU-OS No. 01 00 078 describes an axial fan in which two ball bearings are provided in order to carry the shaft of the driving motor which itself, via a rotor floor, is connected with fan blades. The bearing of the shaft by such ball bearings offers the advantage of a high consistency of rotational speed of the axial fan.

Slide bearings for electric motors and for fans are described, for example, in DE-PS No. 20 16 802, US-PS No. 33 87 153 and DE-OS No. 34 17 127.

Specifically, a bearing arrangement is known from DE-PS No. 20 16 802 wherein a ring groove is disposed in the wall of the bore of a bearing support part and is in alignment with another ring groove in the circumference of a bearing bush, and into which a radially elastic detent element is inserted. The width of the grooves permit an axial play between the bearing bush and the bearing part. However, a bearing arrangement of this type is relatively hard to manufacture because a groove must be placed in the bearing part as well as in the bearing bush which is undesirable with respect to manufacturing because of the required additional processing step.

Also in the bearing arrangement described in US-PS No. 33 87 153, the bearing bush has grooves on its outer circumference into which O-rings are placed, which O-rings are used for the sealing-off of the lubricant. In this known bearing arrangement, the slide bearing unit is constructed of two parts which, by a spring ring mounted at the end of the shaft, are prestressed with respect to centering the rotor. Because of the additional grooves in both slide bearing parts, this known bearing arrangement is also costly with respect to manufacturing and is also difficult to assemble because of the multipart construction of the slide bearing.

The small-size fan described in DE-OS No. 34 17 127 uses a sintered body provided with steps which is housed in a bearing tube with faces which correspond to the steps of the sintered bodies. The sintered body is secured at the steps of the bearing tube by an intermediate element for which a spring spacing element may possibly be used. In the case of this known small-size fan, the position of the shoulders of the sintered body must be assigned precisely to the steps of the bearing tube, which, as far as the manufacturing is concerned, may also lead to problems.

With respect to the consistency of the rotational speed, sintered bearings are inferior to ball bearings, but are preferable with respect to noise.

Therefore, depending on the desired use, axial fans, while in other respects are of the same construction, are either expediently equipped with sintered bearings or with ball bearings. If a high rotational consistency is desired, ball bearings must be preferred. However, if the axial fan is to operate at a particularly low noise level, sintered bearings are more preferred.

Even though the user normally does not evaluate the bearing, it is a significant advantage for a manufacturer to be able to design the bearing of an axial fan such that this fan may then be equipped with either a ball bearing or a slide bearing. An axial fan, which is compatible with being equipped with a slide bearing or a ball bearing would therefore represent an important advantage.

It is therefore the object of the present invention to provide for an axially compact small-size fan having a bearing arrangement which permits the use of a bearing unit which is easy to manufacture and in which this slide bearing can be replaced by a ball bearing without any difficulty. A bearing arrangement according to the invention is achieved in that the bearing unit is braced between a first shoulder of the bearing support tube and a second shoulder of a closure element cooperating with the bearing support tube. In this bearing arrangement the bearing unit is therefore disposed between a first shoulder of the bearing support tube which, for example, may be formed by a projection projecting inwardly into the interior, at the rotor-bottom-side end of the bearing support tube, and, on the other side and a second shoulder, which acts upon the end of the bearing unit which is opposite the rotor bottom, and consists of the closure element cooperating with the bearing support tube.

The bearing arrangement may be used very advantageously in axially compact small-size fans for the cooling of electrical components.

In this manner, the slide bearing unit requires no grooves and rings inserted into it for its fastening in the small-size fan, and in addition, without any significant structural changes, can be replaced by a ball bearing. Instead of the slide bearing unit. Such can be accomplished using two ball bearings separated by a spacing sleeve provided between the two shoulders.

A fastening of the closure element constructed as a plastic part which braces the bearing unit between a first and a second shoulder of the bearing support tube is shown in German Patent Application No. P 37 31 710.5 and is constructed with a bayonet-type closure fastener. The bayonet-type fastening is located at the inner bore of the bearing support tube and requires a surrounding radial groove which can be produced only by machining. This machining causes relatively high costs.

A further development of the invention consists of the fact that the closure element is a bayonet-type closure element. In this manner, a particularly fast assembly of the bearing arrangement becomes possible: The bearing support tube can contain a first rubber ring, a plastic sleeve and a second rubber ring. Here, the bearing unit and the rubber rings and sleeve are pushed onto the shaft with the bearing unit then being braced by the bayonet-type closure element between its shoulder and the shoulder of the bearing support tube.

Another further development of the invention consists of providing a plastic sleeve between the first shoulder and a collar of the slide bearing unit resting against the second shoulder. In addition, one rubber ring respectively may be provided between the first shoulder and the sleeve, and between the sleeve and the collar. Even without these rubber rings, an elastic bearing exists and no rigid press fit.

It is also advantageous for a sleeve consisting of an elastic material, such as rubber, to be arranged between the first shoulder and a collar of the slide bearing unit which rests against the second shoulder. In this manner, the sintered body of the slide bearing unit may be designed to be thinner which means, in turn, that this sintered body may be pressed. As a result, it becomes possible to provide, at the bearing surface of the shaft in the bore of the sintered body, a recess whereby the bearing surface is reduced.

The sleeve consisting of the elastic material may be braced axially between the first shoulder and the collar. The first shoulder consists of a radial thickening area of the bearing support tube pointing toward the inside of the fan unit. In axial direction, the sleeve consisting of the elastic material may extend to the end of the thickening area facing away from the first shoulder or beyond this end. In radial direction, the sleeve consisting of the elastic material is disposed between the bearing support tube and the slide bearing unit.

A further development of the invention also consists of the fact that, between the first shoulder and a collar of the slide bearing unit which rests against the second shoulder by a rubber ring, an additional rubber ring and a plastic sleeve are provided. This type of a design is particularly suitable when, instead of a double roller bearing, two separate roller bearings are to be used.

Finally, it is also advantageous for a printed circuit board to be connected with the bearing support tube by an insulating part, because, in this manner, an expedient possibility is created for the housing of the required electrical components in the small-size fan.

Other objects, advantages and novel features of the present invention will become apparent from the following detailed description of the invention when considered in conjunction with the accompanying drawings.

DETAILED DESCRIPTION OF THE DRAWINGS

Figure 1:
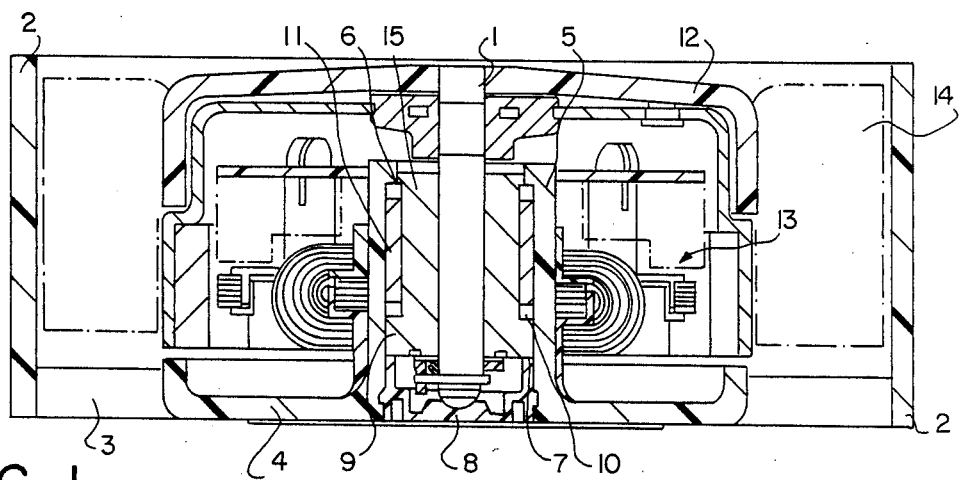
FIG. 1 shows a sectional view of a first embodiment of the bearing arrangement of a small-size fan.

FIG. 1 shows a small-size fan having a shaft 1 with a central driving motor 13 held by a flange 4 and a bearing support tube 5, and with an impeller 12 fastened at the shaft 1 with fan blades 14 being fitted onto this impeller 12. The shaft 1 is disposed in a slide bearing unit 15 which is braced between a shoulder 6 of the bearing support tube 5 and a shoulder 7 of a bayonet-type closure element 8 inserted into the bearing support tube 5. The slide bearing unit 15 is fixed between the two shoulders 6, 7 by its collar portion 9 and by two rubber rings 10 and a plastic sleeve 11.

During the assembly of the bearing arrangement, the bearing support tube 5 is first fitted onto the shaft 1. Then a first rubber ring 10 is inserted which abuts the shoulder 6 of the bearing support tube 5. Subsequently, the plastic sleeve 11 is inserted into the bearing support tube 5. Then the other rubber ring 10 is placed at the outer end of the plastic sleeve 11 in the bearing support tube 5. Then, the slide bearing unit 15 is inserted and the bayonet-type closure element 8 is then finally connected with the bearing support tube 5, whereby the bearing for the shaft 1 is closed off.

In the embodiment of FIG. 1, instead of the slide bearing unit 15, a ball bearing may easily be used, in which case a double roller bearing is expediently provided. At its outer circumference, the ball bearing will then rest between the shoulders 6, 7 and be firmly fixed in this position. The rubber rings 10 and the plastic sleeve 11 are not required in this case.

The housing 2, motor flange 4 and webs 3, which connect the housing 2 with the motor flange 4, may be constructed of the same material, or in one piece. It is also possible to mount the fan blades 14 by a ring (not shown) which is pressed onto the outer circumference of the rotor bottom 12.

An important aspect of the invention is that the slide bearing unit 15 be fixed between two shoulders 6, 7 of the bearing support tube 5, or the closure element 8 connected with it, so that no groove or grooves must be placed in the slide bearing unit 15.

Figure 2:
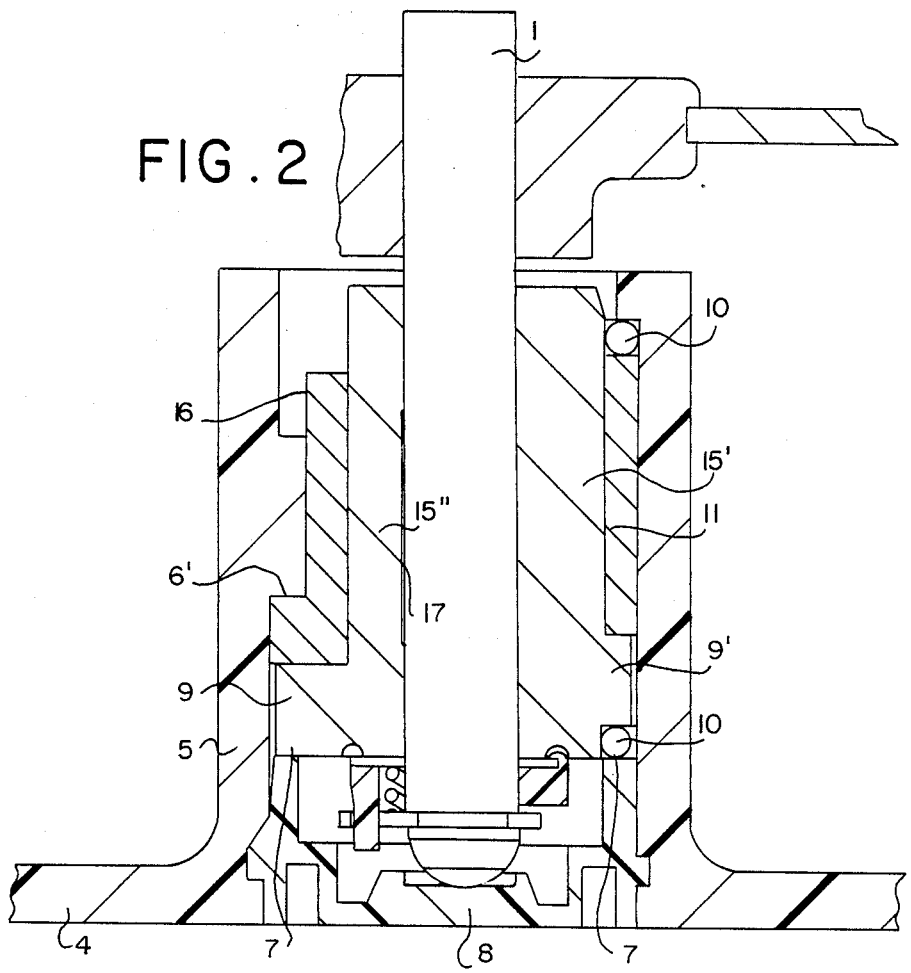
FIG. 2, in the right and the left half respectively, shows a sectional view of a second and third embodiment of a bearing arrangement for a small-size fan.

In the right half of FIG. 2, a second embodiment of the invention is shown which differs from the embodiment of FIG. 1, in that the rubber ring 10 is not provided between the plastic sleeve 11 and the collar portion 9' of the slide bearing unit 15', but rather is disposed between the collar portion 9' and the stop 7 of the closure element 8.

In a third embodiment shown in the left half of FIG. 2, a sleeve 16, may consist of rubber, is provided between the shoulder 6' of the bearing support tube 5 and the collar 9 of the slide bearing unit 15"; i.e., the slide bearing unit 15", by the sleeve 16, is braced between the shoulder 6' formed by a thickening of the bearing support tube 5 and the shoulder 7 of the bayonet-type closure element 8. Instead of rubber, another suitable elastic material may also be used for the sleeve 16.

As a result of this sleeve 16, the slide bearing unit 15" can be designed to be thinner on the order of a wall thickness of approximately 2 mm, so that it can be produced from a sintered body by pressing. Thus, it becomes possible in a simple manner to provide a recess 17 at the inner circumference of the slide bearing unit 15" by which the bearing surface between the slide bearing unit 15" and the shaft 1 is reduced considerably. If the slide bearing unit 15" has a larger wall thickness, it cannot be pressed from a sintered body by pressing, which means in practice that a recess in the bore of the sintered body, which reduces the bearing surface, is difficult to produce.

Figure 3:
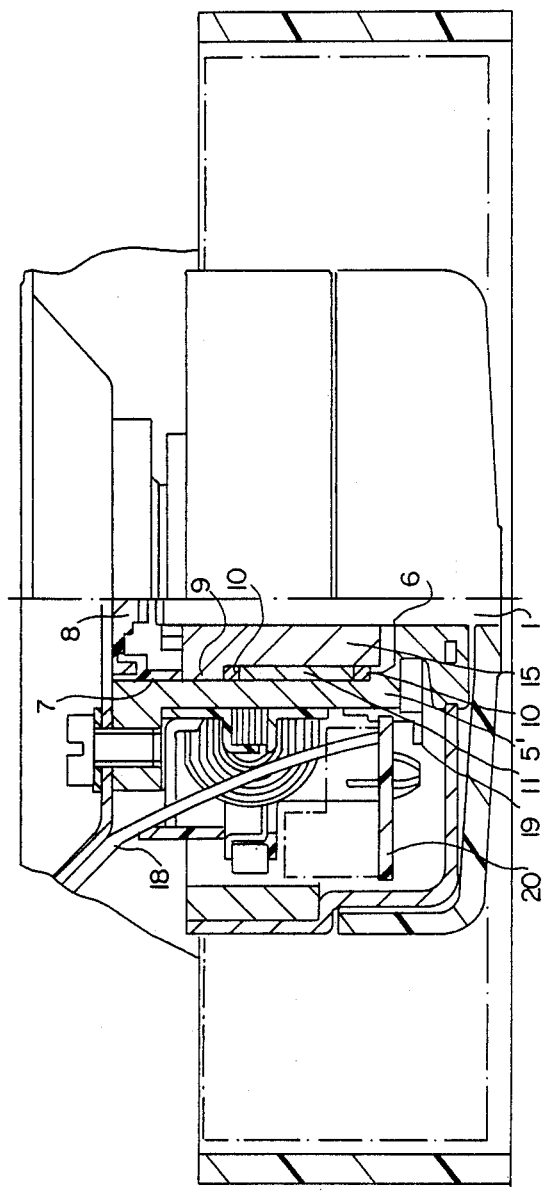
FIG. 3 shows a sectional view of a fourth embodiment of the bearing arrangement with a printed circuit board connected with the bearing support tube.

FIG. 3 shows an embodiment of the invention which corresponds largely to the embodiment of FIG. 1. In the embodiment of FIG. 3, the slide bearing unit 15" is fixed between the shoulder 6 of the bearing support tube 5' and the shoulder 7 of the bayonet-type closure element 8 which is connected with the bearing support tube 5'. In the embodiment of FIG. 3, a printed circuit board 20 is shown connected to a power feed line 18. This printed circuit board 20 is connected with the bearing support tube 5' by insulating sleeve 19.

Figure 4:
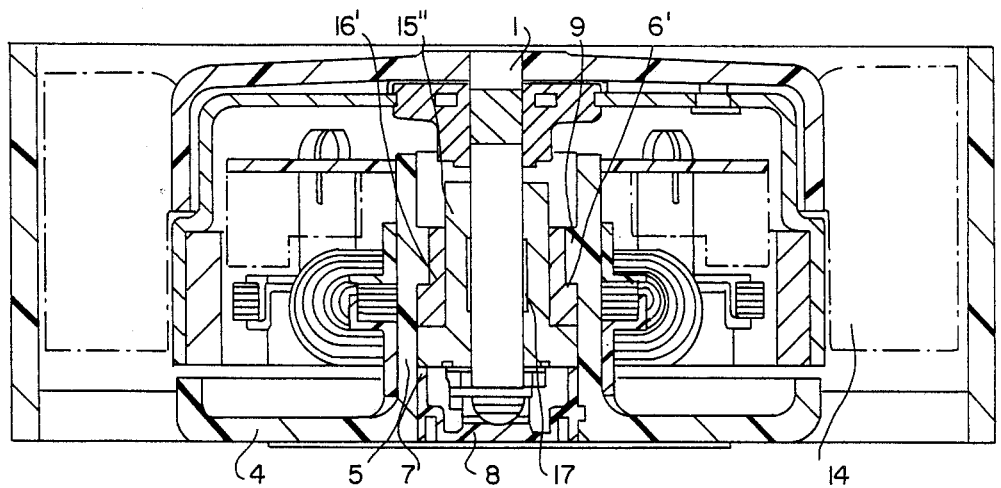
FIGS. 4 and 5, respectively, show sectional views of a fifth and sixth embodiment of the bearing arrangement which are similar to the third embodiment.
Figure 5:
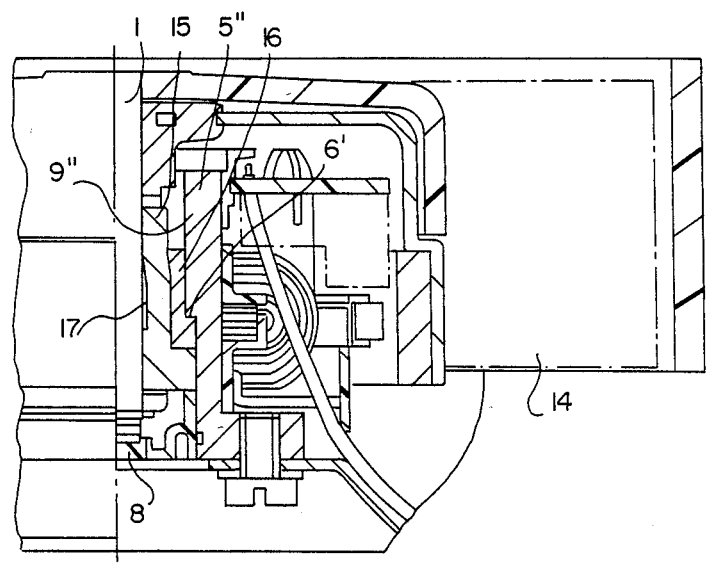

FIGS. 4 and 5 show a fifth and sixth embodiment respectively which are similar to the third embodiment. While in the third embodiment (compare left half of FIG. 2), the sleeve 16 extends in axial direction beyond the thickening of the bearing support tube 5, in the embodiment of FIG. 4, the thickening of bearing support tube 5 and the sleeve 16' ends flush with one another at the end facing away from the shoulder 6'. In the embodiment of FIG. 5 (which is less suitable for ball bearings), the thickening portion 9" of the bearing support tube 5" extends to its end facing away from the shoulder 6', which permits easy manufacturing.

In these embodiments of the present invention, the sintered slide bearing unit 15 is fixed between the two shoulders 6,7 of the bearing support tube 5 or of the bayonet-type closing element 8 connected with it. The slide bearing unit 15 has no grooves or channels and can therefore be manufactured in an easy manner. In addition, the bearing arrangement can be assembled easily. In the bearing arrangement, the slide bearing unit—possibly together with the rubber rings and the plastic sleeve—can be replaced by a double ball bearing or by two ball bearings which are separated from one another by a spacing sleeve, which means that the bearing arrangement can be manufactured to be compatible with slide bearings and ball bearings.

It is particularly advantageous to design the bearing arrangement with the sleeve consisting of an elastic material. By this sleeve, the wall thickness of the slide bearing unit can be reduced to such an extent that its sintered body can be produced by pressing, which makes it possible to reduce the bearing surface between the slide bearing unit and the shaft by a recess.

Figure 6:
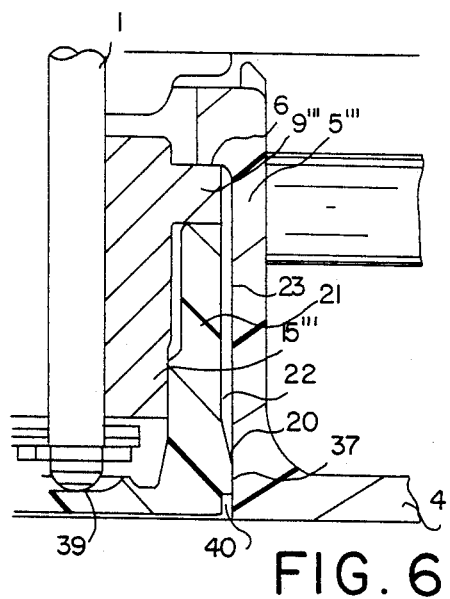
FIG. 6 shows a seventh embodiment of the bearing arrangement which is similar to the third bearing embodiment shown at the right hand side of FIG. 2.

FIG. 6 shows a further simplified embodiment of a bearing arrangement according to the invention similar to the embodiment of FIG. 2, right side. The inner bore 20 of the bearing support tube 5''' has a reduced slope of about 1° and extends to the shoulder 6. Essentially over the whole length, in axial direction of the inner bore 20 there are three ribs 22 injection-molded onto it which are distributed evenly at the inner circumference and project radially toward the interior.

The interior surfaces of these narrow axial longitudinal ribs 22 have a certain elastic-plastic flexibility or deformability in radial direction. They are therefore suitable as a snug fit for the bearing unit 15, but also for the coaxial thick-walled plastic filling body 21, and only in special cases, must be recalibrated by a simple tool. A filling body 21, preferably made of plastic, in this case, carries out the functions of the covering the bearing unit 15''' in the bearing support tube 5''' as well as axial securing and the sealing off of this space of the bearing unit 15'''. A first side of the radial outer collar portion 9''' of the bearing unit 15''' rests at the first shoulder 6, which is provided at one end of the bearing support tube 5''', preferably away from the side of the flange 4, and on the other side, is held in an axially pressed-on condition by the filling body 21.

The filling body 21 is constructed like a hollow bowl. It is pressed with a press fit friction from the direction of the flange 4, into the inner bore 20 of the bearing support tube. The tube is developed in one piece with the flange 4 as a plastic part, in such a manner that the interior surface of the hollow bowl rests against the rounded end of the shaft 1. A punctiform bearing 39 without any axial play exists at that rounded end. The axial position of the filling body 21 is obtained by a bonding agent in an exterior groove 40 of the filling body which essentially fills out the remaining bearing space The filling body 21 for the guiding of the bearing unit 15''' has a precise outer guiding surface 37 in the lower or central area, for the double bearing unit 15.'''

Figure 7:
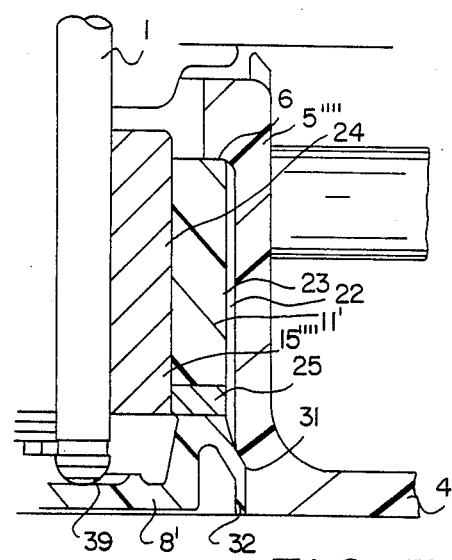
FIG. 7 shows an eighth embodiment of the bearing arrangement which is somewhat similar to that shown in FIG. 6.

In FIG. 7, the bearing unit 15'''' on the outside is constructed to be approximately barrel-shaped with a bulging side 24. The sleeve 11' is pressed over this bulging side or is applied to it firmly by another process (such as hot forming). The thus obtained composite part 11', 15'''' is pushed in from the direction of the flange 4 side, until one face of the sleeve 11', the latter preferably consisting of plastic, against the other face of the sleeve 11'. This rubber disk 25 pressed against sleeve 11' in axial direction by the closure element 8, The sleeve 11' and thus also the bearing unit 15'''' are radially centered and held at the inside edges 23 of the ribs 22. For the axial securing, a groove 31 is worked into the flange area in the inner bore 20 of the bearing support tube 5'''', into which radially rebounding noses 32 of cap 8' lock.

Figure 8:
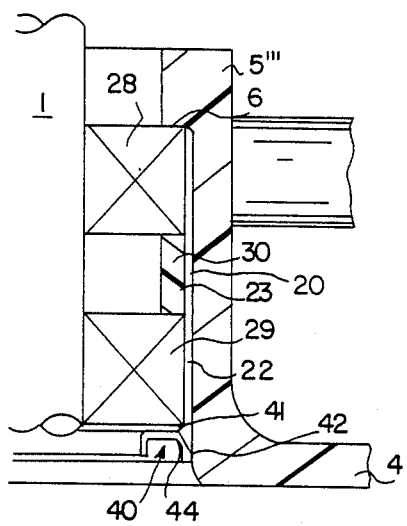
FIG. 8 shows a ninth embodiment of the bearing arrangement for supporting ball bearings and is similar to the embodiment of FIG. 6.

FIG. 8 shows another embodiment having a radially inner shoulder with a stop surface 6, at the end of the bearing support tube 5 away from the side of the flange 4 which is constructed in one piece with the bearing tube as a plastic die-cast part.

Again, from the direction of the flange 4 side, the inner bore 20 is practically "filled out" by the thin longitudinal ribs 22 which axially extend over almost the whole cylindrical wall 20. A first ball bearing 28 is pushed in against the face 23 of the longitudinal ribs 22, preferably with a slight press fit. Next, a spacing sleeve 30 is inserted which rests against the outer races of the first bearing 28 and a second bearing 29, which follows and is also pushed in.

The support bearing tube 5''' arrangement, which is provided with a through-bore opening toward flange 4, has radially flexible thin longitudinal ribs 22. This makes it possible to insert the bearings from the direction of the flange side and have the bearing wall 20 "filled in". After insertion of the bearings, the closure element 40 provides an axial securing and the sealing-off, or at least covering of the bearing space.

In the embodiment of FIG. 8, a deep-drawn closure element part 40 is provided which is introduced from the direction of the flange side. This deep-drawn part 40 is in a ring-shape and is provided with a U-shaped cross section. Spring tabs 41 project from the direction, of the bottom surface of the U profile part axially to the outside when the ring is pushed into the bearing bore 20, are guided until they stop against the outer race of the second ball bearing 29. When this ring 40 is pressed all the way in, radially rebounding spring tabs 42 of the closure element 40 have their sharp outer edges hook themselves into the plastic interior wall of the bore 20 of the bearing bore. There are three such rebounding tabs that are bent outwardly from the element 40. In this manner, a springy axial securing of the bearing set or of the thus formed bearing unit is achieved. In this embodiment, a covering or seal may also be added which, however, is not shown in detail in FIG. 8.

Figure 9:
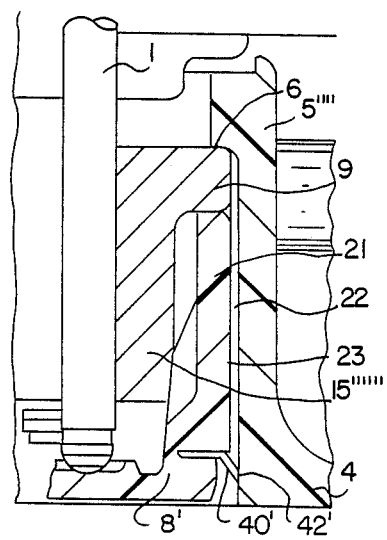
FIG. 9 shows a tenth embodiment of the bearing arrangement similar to that of FIG. 6, but with a spring clip retainer akin to that of FIG. 8.

FIG. 9, in turn, shows a somewhat thick-walled massive plastic cap 8' which is pushed into the radially flexible shell surface of the front surfaces 23 of the ribs 22 of the bearing tube bore 20. The radial flexibility is created by thin longitudinal ribs 22, and in which case a double bearing unit 5'''' with two cylindrical inner bearing surfaces for a preferably sintered slide bearing piece 15''''', with a radial outer collar located at its end, is clamped between the first stop surface 6 and the face of the plastic hollow-bowl pot 21. After the metallic sintered double bearing element 5'''' and then the plastic hollow bowl 21 is pushed in from the direction of the open end up to a stop 6 against the rounded off shaft end, a punctiform bearing is created which has no axial play. This is obtained by a metal ring 40' with radially projecting elastic metal tongues 42' injection-molded on the outside into the relatively thick wall of the plastic bowl 21 in the area of the closed bottom. When the plastic bowl 21 is pushed in, these tongues 42' will then be bent and pressed against the bores 20, where they hook in in the end position, similar to FIG. 8. However, in FIG. 9, the plastic bowl 21 forms a full covering of the bearing space.

Figure 10:
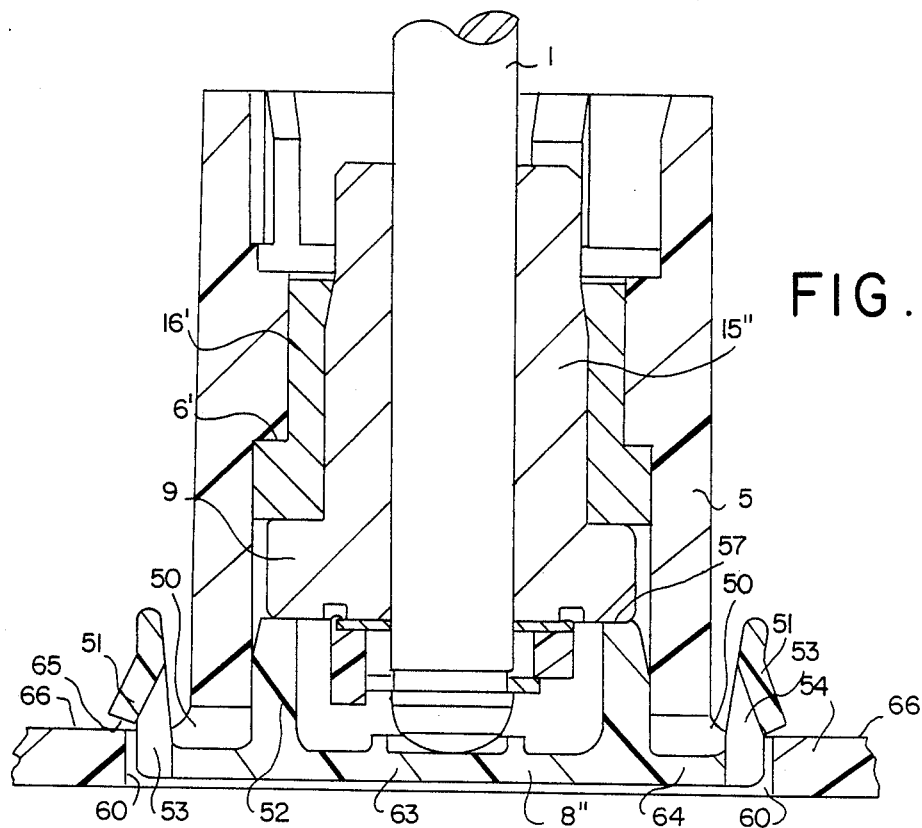
FIG. 10 shows an eleventh embodiment of the bearing arrangement similar to that of FIG. 4, but with a different end cap design.

The embodiment of FIG. 10 is similar to FIG. 4, but utilizes a clip type closure fastener of different design. A sleeve 16' is shown between a shoulder 6' of a bearing support tube 5 and the collar 9 of the slide bearing unit 15''. The slide bearing unit 15' is thus braced between the shoulder 6' formed by a thickening of the bearing support tube 5 and a shoulder 57 of a closure element 8''. The bracing by the closure element, in this case, does not take place by the bayonet-type fastening, as described in FIG. 1, but by elastic projections 51, which lock into corresponding breakthroughs 50 in the area of the flange-side end of the bearing support tube 5. Viewed in axial direction (see FIG. 12), the breakthroughs 50 have the outer contour of tabs 64 and the pertaining projections 51 of the closure element 8'' (with the required overdimension), and, without any additional expenditures, may be manufactured in the injection-molding process. Any reworking or additional treatment is therefore not necessary.

Figure 11:
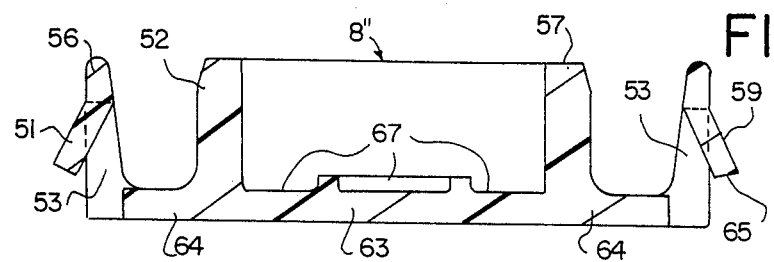
FIGS. 11 and 12 show the end cap of FIG. 10 in greater detail.
Figure 12:
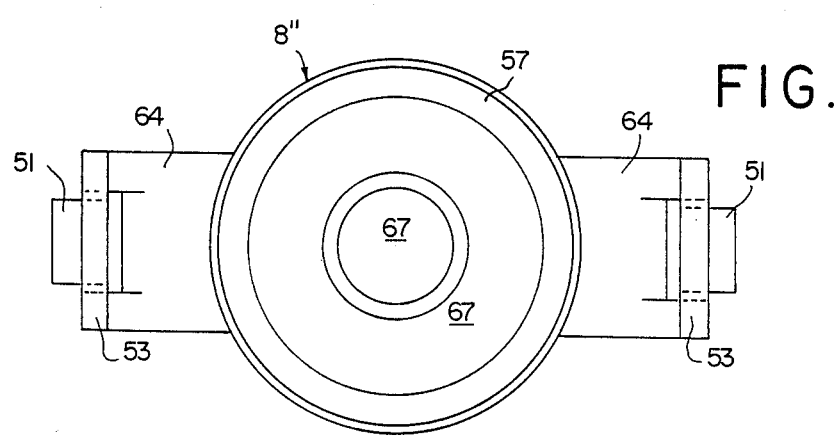

FIGS. 11 and 12 show the closure element 8'' in a sectional and in a plan view. This closure element 8'' may be injection-molded in one piece from plastic (as shown in the embodiment). It consists of a bowl-shaped basic body 52 having a bottom 63 and an essentially cylindrical bowl wall 52, the edge of which forms the shoulder 57. The essentially flat bottom 63 has tabs 64 which project radially toward the outside. At the radial end of the tabs 64 there are arms 53 arranged approximately in parallel with respect to the bowl wall 52. These arms 53 containing elastic projections 51.

The projections 51 project from the upper end area 56 of the arms 53 in a direction downwardly toward the bottom 63 in a radially bent manner and with lateral play to the outside. The projections 51 which because of their thickness and resiliency are collapsed or pressed inwardly during the inserting into the breakthroughs 50 at the exterior sides 59, by the outer edges 60 of the breakthroughs 50. The closure element 8'' is pushed inwardly in an axial direction, until the shoulder 57 rests against the collar 9. Subsequently, the projections 51 spring toward the outside so that their end edges 65 rest against the interior side 66 of the flange 54. By this resting, the shoulder 57 of the closure element 8'' is pressed against the collar 9, whereby the bearing of the shaft 1 is protected from dirt and the leaking of lubricants. The interior side 67 of the bottom 63 of the closure element 8'' presses against the rounded-off axial end of the shaft 1 and thus eliminates the axial play of the shaft.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A bearing arrangement for the shaft of an axial flow small compact sized fan comprising:
   a central driving motor for the fan which has a shaft which drives an impeller of the fan;
   a bearing unit means for said shaft;
   said bearing unit means contacting and supporting said shaft in a radial direction as concerns the rotation of the shaft;
   a bearing support tube means located radially outward of the bearing unit means and supporting said bearing unit means in a radial direction as concerns the rotation axis of the shaft;
   a flow duct surrounding the impeller and having a flange means extending inwardly from adjacent the outer edge of the flow duct;
   the bearing support tube means having a first shoulder portion;
   a closure means having a second shoulder portion;
   the bearing unit means being braced between the first and second shoulder portions; and
   the closure means being supported by said flange means.

2. A bearing arrangement according to claim 1, wherein the bearing unit means has slide bearings.

3. A bearing arrangement according to claim 1, wherein a printed circuit board is connected with the bearing support tube means through an insulation means.

4. A bearing arrangement according to claim 1, wherein the bearing unit means is a sintered bearing.

5. A bearing arrangement according to claim 1, wherein the bearing unit means consists of at least one roller bearing means.

6. A bearing arrangement according to claim 5, wherein the roller bearing unit means is formed of two ball bearings having a spacing sleeve between stator-side races of the roller bearings.

7. A bearing arrangement according to claim 6, wherein the first shoulder is provided at an end of the bearing support tube means located away from the flange means.

8. A bearing arrangement according to claim 1, wherein the first shoulder is provided at an end of the bearing support tube means located away from the flange means.

9. A bearing arrangement according to claim 8, wherein the closure means is constructed as a covering for a bearing space of the bearing support tube means.

10. A bearing arrangement according to claim 1, wherein the closure means is constructed as a covering for a bearing space of the bearing support tube means.

11. A bearing arrangement according to claim 10, wherein the closure means is constructed as a hollow-bowl-shaped plastic part supported by the flange means with a bayonet-type closure.

12. A bearing arrangement according to claim 10, wherein the bearing unit means is secured in its axial position by the closure means utilizing an axially operating spring bracing cooperating with the flange means.

13. A bearing arrangement according to claim 1, wherein the bearing unit means is secured in its axial position by the closure means utilizing an axially operating spring bracing cooperating with the flange means.

14. A bearing arrangement according to claim 13, wherein the closure means is constructed as a hollow-bowl-shaped plastic part supported by the flange means with a bayonet-type closure.

15. A bearing arrangement according to claim 1, wherein there are axially directed breakthroughs in an area of the flange means adjacent the bearing support tube means and into which axially extending arms of the closure means are locked by elastic projections.

16. A bearing arrangement according to claim 15, wherein the breakthroughs as viewed in axial direction, have essentially the outer contour of tab means and projections on the closure means.

17. A bearing arrangement according to claim 15, wherein the closure means is developed as a bowl-shaped basic body with an essentially flat bottom having tab portions projecting radially toward the outside and having arm portions arranged in parallel to the bowl wall, and wherein these arm portions contain a radially elastic projection.

18. A bearing arrangement according to claim 17, wherein an open edge of the bowl wall is constructed as a shoulder rests against a collar portion of the bearing unit means.

19. A bearing arrangement according to claim 18, wherein an outer surface of the bowl bottom is approximately flush with an axial exterior side of the flange means.

20. A bearing arrangement according to claim 17, wherein the elastic projections rest against an interior side of the flange means.

21. A bearing arrangement according to claim 15, wherein the elastic projections rest against an interior side of the flange means.

22. A bearing arrangement according to claim 15, wherein there are axially directed breakthroughs in an area of the flange means adjacent the bearing support tube means and into which axially extending arms of the closure means are locked by elastic projections.

23. A bearing arrangement according to claim 22, wherein the breakthroughs as viewed in axial direction, have essentially the outer contour of tab means and projections on the closure means.

24. A bearing arrangement according to claim 23, wherein the closure means is developed as a bowl-shaped basic body with an essentially flat bottom having tab portions projecting radially toward the outside and having arm portions arranged in parallel to the bowl wall, and wherein these arm portions contain a radially elastic projection.

25. A bearing arrangement according to claim 1, wherein a plastic sleeve means is located between the first shoulder portion and a collar portion of the bearing unit means.

26. A bearing arrangement according to claim 25, wherein the bearing unit means consists of at least one roller bearing means.

27. A bearing arrangement according to claim 25, wherein one rubber ring respectively is provided between the first shoulder and the sleeve means and between the sleeve means and the collar portion.

28. A bearing arrangement according to claim 1, wherein a plastic material sleeve means is located between the first shoulder portion and a collar portion of the bearing unit means.

29. A bearing arrangement according to claim 28, wherein the bearing unit means has a bearing surface with a recess.

30. A bearing arrangement according to claim 28, wherein the plastic material is rubber.

31. A bearing arrangement according to claim 28, wherein the sleeve means consisting of the elastic material is braced axially between the first shoulder portion and the closure means.

32. A bearing arrangement according to claim 28, wherein the first shoulder is formed by a radial thickening area of the bearing support tube means pointing inwardly toward the shaft.

33. A bearing arrangement according to claim 32, wherein the sleeve means consisting of the elastic material extends in axial direction beyond an end of the thickening area facing away from the first shoulder.

34. A bearing arrangement according to claim 32, wherein the sleeve means consisting of the elastic material extends in axial direction to an end of the thickening area facing away from the first shoulder.

35. A bearing arrangement according to claim 28, wherein the sleeve means consisting of the elastic material is provided in radial direction with respect to the shaft axis between the bearing support tube means and the bearing unit means.

* * * * *